(12) United States Patent
Waite

(10) Patent No.: US 6,578,459 B2
(45) Date of Patent: Jun. 17, 2003

(54) METHOD FOR POWER SAW HAVING CUT LINE INDICATOR

(76) Inventor: Lance Waite, 3617 East Decatur, Mesa, AZ (US) 85205

( * ) Notice: Subject to any disclaimer, the term of this patent is extended or adjusted under 35 U.S.C. 154(b) by 0 days.

(21) Appl. No.: 10/161,291

(22) Filed: Jun. 3, 2002

(65) Prior Publication Data

US 2002/0152862 A1 Oct. 24, 2002

Related U.S. Application Data (62) Division of application No. 09/449,154, filed on Nov. 24, 1999, now Pat. No. 6,397,717, which is a division of application No. 08/912,616, filed on Aug. 18, 1997, now Pat. No. 5,996,460, which is a continuation-in-part of application No. 08/430,313, filed on Apr. 28, 1995, now abandoned, which is a continuation of application No. 08/240,600, filed on May 9, 1994, now abandoned, which is a continuation of application No. 08/161,175, filed on Dec. 3, 1993, now abandoned, which is a continuation of application No. 07/851,015, filed on Mar. 13, 1992, now abandoned.

(51) Int. Cl.[7] .............................. B26D 7/00; B26D 7/27
(52) U.S. Cl. ......................... 83/13; 83/520; 83/522.15; 83/471.2; 83/477.1; 83/490; 83/486.1; 30/123
(58) Field of Search ...................... 83/520, 521, 522.15, 83/522.11, 522.19, 471.2, 477.1, 490, 486.1, 13, 581, 954, 571; 30/123

(56) References Cited

U.S. PATENT DOCUMENTS

| | | | |
|---|---|---|---|
| 893,427 A | 7/1908 | Bennett | |
| 1,388,110 A | 8/1921 | Hallock | |
| 1,476,238 A | 12/1923 | Bump | |
| 1,786,925 A | 12/1930 | Wiegelmann | |
| 1,804,764 A | 5/1931 | Grant | |
| 2,307,820 A | 1/1943 | Butters | |
| 2,357,194 A | * 8/1944 | Hazelton et al. | 83/520 |
| 2,488,947 A | 11/1949 | Vavrik | |
| 2,506,610 A | * 5/1950 | Mueller | 83/443 |
| 2,510,471 A | 6/1950 | Horstkotte | |
| 2,806,492 A | 9/1957 | Becker | |
| 3,496,814 A | 2/1970 | Bessim | |
| 3,504,716 A | 4/1970 | Bush et al. | |
| 3,656,391 A | 4/1972 | Von Arx | |
| 3,707,999 A | 1/1973 | Coats | |
| 4,257,297 A | 3/1981 | Nidbella | |
| 4,468,992 A | 9/1984 | McGeehee | |
| 4,503,740 A | 3/1985 | Brand et al. | |
| 4,573,834 A | 3/1986 | Nasu | |
| 4,676,130 A | 6/1987 | Nutt | |
| 4,833,782 A | 5/1989 | Smith | |
| 4,885,967 A | 12/1989 | Bell et al. | |
| 4,887,193 A | 12/1989 | Dickmann | |
| 4,934,233 A | 6/1990 | Brundage et al. | |
| 5,038,481 A | 8/1991 | Smith | |
| 5,285,708 A | 2/1994 | Bosten et al. | |
| 5,375,495 A | 12/1994 | Bosten et al. | |
| 5,996,460 A | * 12/1999 | Waite | 83/520 |
| 6,397,717 B1 | * 6/2002 | Waite | 83/520 |

FOREIGN PATENT DOCUMENTS

| | | |
|---|---|---|
| GB | 711331 | 6/1954 |

* cited by examiner

Primary Examiner—Boyer D. Ashley
(74) Attorney, Agent, or Firm—Workman, Nydegger & Seeley (57) ABSTRACT

A method for use with a power saw having a frame with a first blade rotatably mounted thereon, the first blade having a cutting edge with a maximum first thickness. A light source is mounted on the frame. An opaque barrier has a first slot with a first width. The opaque barrier is positioned in alignment with the light source such that light from the light source passes through the first slot and shines on the first blade so as to produce a shadow of the first blade. The method includes exchanging the first blade with a second blade, the second blade having a maximum second thickness. The opaque barrier is adjusted such that the first slot is replaced with a second slot having a second width, the second width of the second slot being greater than or smaller than the first width of the first slot.

19 Claims, 6 Drawing Sheets

METHOD FOR POWER SAW HAVING CUT LINE INDICATOR

CROSS-REFERENCE TO RELATED APPLICATIONS

This application is a divisional of application Ser. No. 09/449,154, filed Nov. 24, 1999, U.S. Pat. No. 6,397,717, which is a divisional of application Ser. No. 08/912,616, filed Aug. 18, 1997, U.S. Pat. No. 5,996,460, which is a continuation-in-part of application Ser. No. 08/430,313 filed Apr. 28, 1995, now abandoned, which is a continuation of application Ser. No. 08/240,600 filed May 9, 1994, now abandoned; which is a continuation of application Ser. No. 08/161,175 filed Dec. 3, 1993, now abandoned; which is a continuation of application Ser. No. 07/851,015 filed Mar. 13, 1992, now abandoned. For purposes of disclosure, each of the above references are incorporated herein by specific reference.

BACKGROUND OF THE INVENTION

1. The Field of the Invention

This invention relates to visual cut indicators for power cutting equipment in which a cutting element, such as a circular saw blade, moves along a cutting path. More particularly, the invention relates to improved power cutting equipment of the type where a visual indication of the location of the cutting path, commonly referred to as the kerf, is projected onto a workpiece to be cut by the cutting equipment.

2. The Relevant Technology

Kerf indicators allow an operator to more accurately position a workpiece in relation to a cutting element, such as a saw blade, in order to cut the workpiece. However, with conventional kerf indicators, skill and care must be exercised by the operator to cut only at the desired location on the workpiece. An operator may gain skill through experience and training, but must always take time to carefully align the workpiece before each cut is made. This time-consuming process decreases the operator's productivity and does not guarantee that a mistake will not be made. Even the most skilled operators make occasional miscuts due to the inherent difficulty of aligning the blade and workpiece.

Using conventional power cutting equipment, for example a miter saw, an operator wishing to make a cut in a workpiece must visually line up the point at which the workpiece is to be cut with a plane through which the saw blade will move. The motion of the blade is confined to this plane and the kerf will lie in this plane. Various means are used to assist the operator in aligning the workpiece and the saw blade. For example, conventional miter saws have a channel in a fence. The fence rises from a table that supports the workpiece. When the saw blade is moved through its plane of motion to make a cut, the blade passes through the channel in the fence. Consequently, the channel can be used as a rough indication of where the kerf will be made. The point at which the workpiece is to be cut can accordingly be aligned with the channel.

However, because the channel is necessarily larger than the width of the saw blade, the exact position of the cut to be made is difficult to determine with precision using only the channel as a guide. Moreover, a point at which a convoluted workpiece surface, such as the surface of molding, is to be cut may be difficult to align with the channel if the marking indicating the point to be cut is interior to the edges of the workpiece.

It becomes even more difficult to make accurate cuts with conventional equipment if the kerf is to be at an angle through the workpiece, as opposed to orthogonal. When cutting on an angle, the point at which the blade begins to cut the workpiece may appear to an operator to be spaced from the channel in a direction along the fence. This occurs because the plane through which the blade moves is at an angle as viewed by the operator. Thus, even the most experienced operator may have difficulty making an angled cut.

Furthermore, certain cutting equipment, for example radial arm saws and compound miter saws, allow adjustments of the saw blade for angular cuts by rotation in two axes. This may further increase the difficulty of alignment, and increase the time required to perform the cutting operation.

In practice, operators often bring the blade into close proximity with the workpiece to better estimate the position of the cut to be made. In some situations, operators will actually bring the blade into contact with the workpiece so that a very small portion of the workpiece is removed to indicate the kerf, a technique sometimes referred to as "nibbling." These practices take time and, in the case of nibbling, may result in workpieces that are ruined and unusable or must be repaired at an additional expense.

Attempts have been made to solve these problems by projecting a shadow using a light source positioned behind the saw blade, or behind an object such as a wire or bar aligned with the blade, to provide the necessary reference for indicating the kerf. Such devices, however, have the inherent difficulty of aligning the light source, the wire or bar etc. (if such is used) and the cutting element, to give an accurate indication of the path of the cutting element. Elaborate provisions for this alignment have been provided in prior devices, requiring precise adjustment.

Another difficulty with such shadow indicators is a lack of definition in the shadow line, i.e. the shadow line has an umbra and a penumbra. The umbra and penumbra may be so closely associated that the umbra appears to have a blurred edge, which further complicates making an accurate cut in the workpiece.

Moreover in kerf indicating device that use a light source, the light source and its housing and surrounding structure may become extremely hot. This exposes the operator to potential burn injury if he or she inadvertently touches the hot parts of the device. The danger is heightened when a high intensity light bulb such as a halogen bulb, for example, is used. Such a high intensity bulb may be required if the device is to be used outside in bright sunlight.

Additionally, in conventional devices where the shadow of the cutting element is used as a kerf indicator, only one side of the kerf is accurately indicated. For example, the shadow may shade part of the workpiece creating a more or less defined line along which the blade will cut. However, the width of the blade may cut inside or outside the shadow line, i.e. on one side or the other of the line between shadow and light. If the cut is not made on the proper side of the shadow line, the workpiece will be too short by the width of the blade. This requires additional effort on the part of the operator to determine and orient the workpiece such that the width of the kerf (i.e. the width of the blade) falls on the waste side of the mark indicating where the cut is to be made.

Other arrangements for indicating the location of a cut to be made include projecting a laser beam onto the workpiece that is aligned with the saw blade path. Unfortunately, such devices are costly, particularly for small power cutting equipment such as a miter saw or radial arm saw. In some such cases, the laser kerf indicator may constitute a significant percentage of the total cost of the saw.

Moreover, laser kerf indicators, like the shadow kerf indicators described above, indicate only one side of the kerf, forcing the operator to carefully consider on which side of the laser line the blade will pass and aligning the waste portion of the workpiece accordingly. Lasers also pose a potential threat to the eyes of an operator. If the laser used is fairly powerful, for example, a laser to be used outside in direct sunlight, and the laser is inadvertently directed into the eyes of the operator, an injury may result.

Laser kerf indicating devices face additional problems when the cutting element, such as a saw blade, is changed. The new blade may vary in width from the previous blade requiring an expensive and time-consuming adjustment to the laser. Furthermore, laser kerf indicators may require periodic adjustment due to misalignment caused by vibration of the equipment, unintentional physical shocks to the equipment, or thermal expansion of the equipment components that cause the components of the device to creep out of alignment.

Accordingly, there exists a need in the art for an improved kerf indicating device that accurately and completely indicates where the kerf will fall on the workpiece, which is inexpensive and which safeguards against injury to the operator. The present invention is directed to fulfilling this need.

BRIEF SUMMARY OF THE INVENTION

Briefly, and in general terms, the present invention accordingly provides an improved apparatus and method for providing a visual kerf indicator for cutting equipment having a cutting element for cutting along a kerf. This kerf indication method includes providing a light source positioned in fixed relation to the cutting element such that light is projected along a route to the cutting element to project a shadow of the cutting element which indicates the location and width of the cutting path or kerf. The light source, the cutting element, and the cutting path each lie in a single, or common, plane. The motion of the cutting element is confined to this common plane. A barrier member having a plurality of opaque barriers, each having a narrow elongated opening (a slot, or slit) therein, is provided, positioned along the route of the projected light between the light source and the cutting element. The slots of the barrier member are positioned in alignment with the common plane so that a portion of the relatively small width of each of the slots is on each side of the common plane along the length of each slot. Light from the light source is planarized by the barrier member slots so that such light projects a shadow of the cutting element indicating the kerf.

In a more detailed aspect, a reflector configured to reflect light from the light source toward the cutting element is provided. This reflector intensifies the light projected by the source of light if positioned behind the light source, for example, or allows the route of the projected light to be manipulated, for better positioning of the light source for example.

In a further more detailed aspect the barrier member is provided with a reflective surface. This reflective surface is disposed at an oblique angle with respect to the common plane. Accordingly light projected from the light source striking this surface is reflected in a direction other than back at the light source. In this way light not used in projecting a shadow of the cutting element can be directed out of the kerf indicator device decreasing heat build up. A second reflective surface can be provided which intercepts such reflected light and redirects it towards the workpiece, providing improved illumination of the workpiece.

In another detailed aspect, an adjustability of the width of at least one slot of the barrier member may be provided. This adjustability allows an operator to improve the definition of the shadow projected by the cutting element and to compensate for a change in the width or diameter of the cuffing element. In another more detailed aspect the projected shadow corresponds in width to the cut that will be made, giving an operator an indication of how to position the waste side of a workpiece relative to the cut to be made in the workpiece.

In a further detailed aspect a reflector used with the light source to project light can be given an elliptical or parabolic shape in a cross section thereof. The light source can be positioned at one foci of such an elliptical shape. The other foci of the ellipse can be positioned between two of the slots in the barrier member and within the common plane. Such a configuration provides an improved kerf indication.

Reflective and non-reflective surfaces provided adjacent the light source, silted opaque barriers, and cutting element further enhance the sharpness and accuracy of the projected shadow indication of the cut.

Other features and advantages the present invention will become apparent from the following detailed description, taken with the accompanying drawings, which illustrate, by way of example, the features of the invention.

These and other objects, features, and advantages of the present invention will become more fully apparent from the following description and appended claims, or may be learned by the practice of the invention as set forth hereinafter.

BRIEF DESCRIPTION OF THE DRAWINGS

The accompanying drawings illustrate the present invention and are a part of the specification. Together with the following description, the drawings demonstrate and explain the principles of the present invention. These drawings depict only typical embodiments of the present invention and are not therefore to be considered as limiting the scope of the invention which is defined by the attached claims. In the drawings:

DETAILED DESCRIPTION OF THE PREFERRED EMBODIMENTS

As shown in the drawings, which are provided for purpose of illustration and not by way of limitation, one embodiment of the invention is incorporated into a saw 10 having a saw blade 11 for cutting a workpiece 12. The saw described herein is a miter saw. It will be apparent to one skilled in the art, however, that the invention could be embodied in any of a number of saw types, for example: radial arm saws; chop saws, jig saws, band saws, and hand held circular saws.

Figure 1:
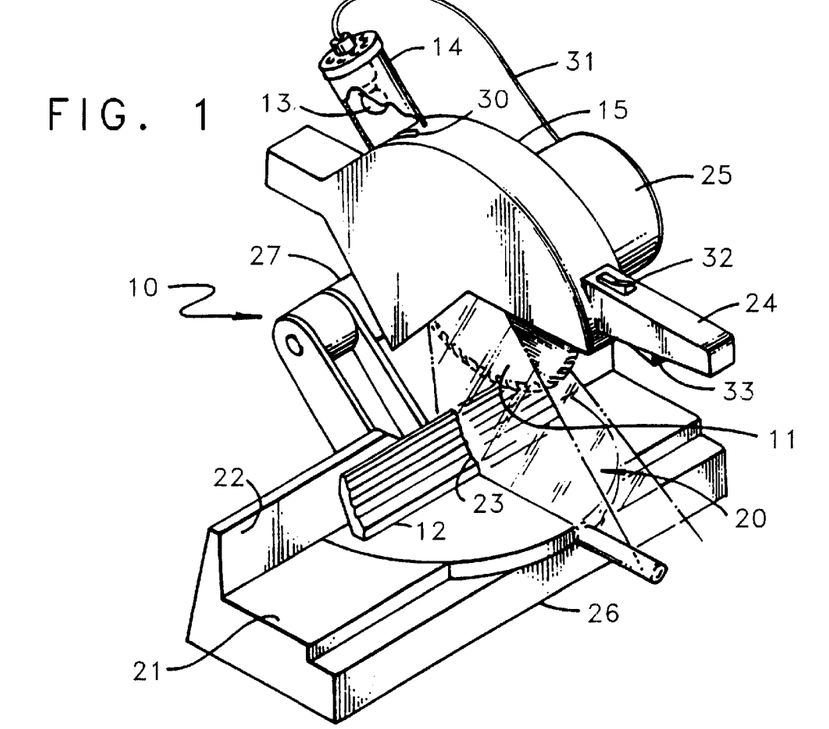
FIG. 1 is a perspective view of cutting equipment embodying a kerf indicator according to the present invention.

Referring to FIG. 1, in accordance with the present invention, a light source comprising a light bulb 13 is disposed in a housing 14 fixedly mated or otherwise integral with a shroud 15 which partially encloses a saw blade 11. The light source 13 projects light rays 20 onto the workpiece 12 through a portion of the shroud 15 defining a slot opening 30. The workpiece 12 is placed on a table 21 and made to abut a fence 22. After entering the shroud 15, the light rays 20 are interrupted by the saw blade 11 which casts a shadow line 23 onto the workpiece.

An operator (not shown) perceives the location of the cut to be made in the workpiece 12 by means of the shadow line 23 and can easily adjust the relative position of the workpiece 12 to obtain an accurately located cut. Movement of blade 11 is confined to a plane containing the blade and the shadow line 23. The operator grasps a handle 24 and rotates a portion of the miter saw 10 downward toward the workpiece 12. The portion of the miter saw 10 which rotates includes a motor 25, blade 11, and shroud 15, all carried on an arm 27 rotatably connected to a base 26. Because blade 11 travels in the plane containing the shadow line, the kerf or cutting path is indicated by the shadow line 23 regardless of the position of the blade in its arc of travel.

The shadow line 23 comprises a narrow strip of shadow indicating the path of the blade 11. The shadow line 23 can be made to correspond exactly to the width of the blade and the consequent width of the kerf. Therefore, the shadow line 23 shows precisely the material to be removed in cutting and allows the operator to easily orient the workpiece such that the saw blade 11 cuts on a waste side of a line indicating the point at which the workpiece must be cut.

Coordinating the width of the shadow line 23 and the blade 11 is accomplished by collimating, or more properly "planarizing," the light 20 projected from the light source 13 in a particular way so that projected light rays are substantially parallel with the plane of motion of the blade 11. Individual light rays 20 within the plane, however, preferably diverge along the length of the plane. This produces an elongated shadow line 23 on the workpiece 12, indicating the full length of the kerf.

The relative distances between the light source 13, the slot 30, and the blade 11 are also important in coordinating the width of the shadow line 23 and the blade 11. These distances are fixed at values which result in a shadow line 23 of the desired width and must be determined independently for each different type of saw used, depending on the components of the device. Such a determination is within the ambit of one skilled in the art without undue experimentation.

Once the above distances are determined for a particular saw 10, it has been found that changing the blade 11 to one of a slightly different thickness produces a shadow line of corresponding larger or smaller thickness. While this may result in the edges of the shadow line 23 becoming fuzzy, any such lack of definition can be mitigated as set forth below so that the accuracy of the kerf indication is not effected by changing the width of the saw blade. Also, the blade may be slightly displaced within the projected light by a small amount, such as may occur in changing the blade, without affecting accuracy. Consequently, adjustments necessary to precisely align the light source and the blade, as in prior devices, are not required.

Electrical power is conveyed to the light source 13 by means of a power cord 31 in a conventional manner. A switch 32 is employed in the illustrated embodiment to turn the light source 13 on and off independently from the saw 10. This allows a user to investigate the location of a cut to be made on a workpiece without turning on the power to the saw. The saw 10 may be controlled, for example, by a second switch 33. Turning on the light source 13 only when needed may also lengthen the service life of the bulb and will decrease heat build-up in the housing 14.

In another embodiment, the intensity of the light projected from the light source 13 may be varied by a further switch or dial (not shown) which controls the power to the light source. This may be convenient if the saw 10 is used in differing ambient light conditions, for example indoors versus outdoors.

Figure 2:
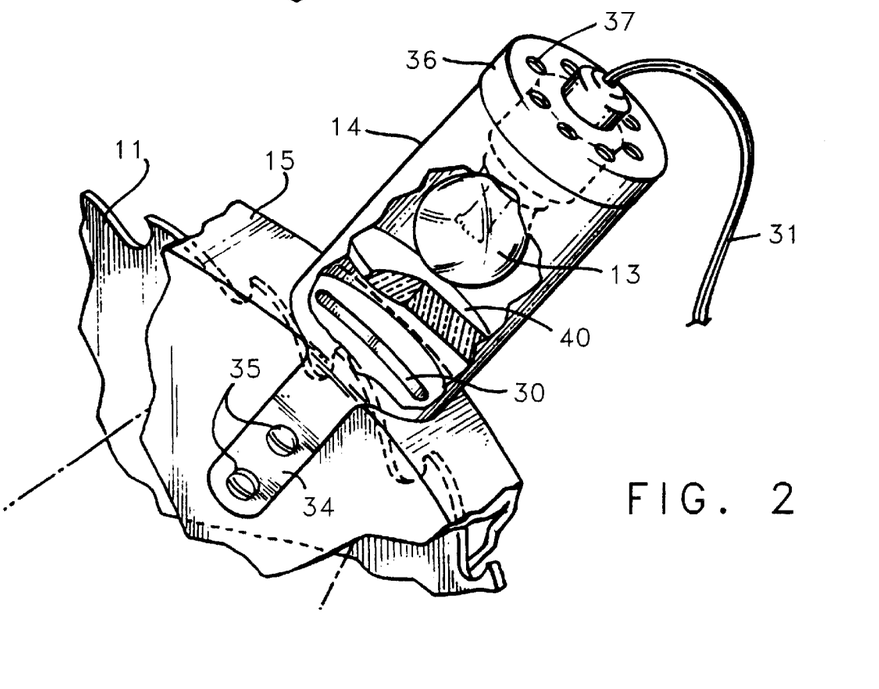
FIG. 2 is a perspective view, partially in section, of the kerf indicator illustrated in FIG. 1.

Referring now to FIG. 2, the housing 14 is fixedly attached to the shroud 15 by means of a mounting flange 34 on each of the two opposite side of the housing 14. The mounting flanges 34 are secured to the shroud by fasteners 35, such as bolts or screws. The light source 13 is disposed on a cap portion 36 which is releasably attached to the rest of the housing 14. This allows the light source to be easily accessed for cleaning and to change the light bulb. Ventilation holes 37 are provided to decrease heat build-up within the housing. The housing may be tilted somewhat in relation to the shroud 15 so that the light rays 20 are directed, insofar as possible, to miss a shaft (not shown) about which the blade 11 rotates.

Planarization of the light 20 from the light source 13 is performed by the slot 30 which has an elongated configuration and is relatively narrow in width. Slot 30 typically has a width corresponding to the thickness of blade 11 plus an additional width in a range of about 0.07 inches to about 0.01 inches with about 0.05 inches to about 0.03 inches being most preferred. Smaller widths than the forgoing may be used, depending on the intensity of light projected by the light source 13.

As will be apparent, the length of the slot and distance between the slot and light source 13 determine the length of the shadow line 23 projected by the cut-line indicator. The relative distances are adjusted so that a shadow line 23 is provided which is long enough to fall on a workpiece 12 throughout the entire kerf as limited by the range of motion of the arm 27 which carries the saw blade 11. The slot 30 is aligned with the plane of the blade 11 and the resulting kerf.

As shown in FIG. 2, an optical element 40 may be interposed between the light source 13 and the saw blade 11 to collimate the light 20 projected onto the blade 11 and workpiece 12. The optical element 40 is a lens and is preferably a lens having only one axis of curvature or optical axis. A lens of this type, when properly oriented, further planarizes light so as to give light rays oriented parallel to the plane in which the blade 11 moves, but otherwise allows divergence of the light rays, allowing for a long shadow line 23 as described above.

If an optical element 40 is used, the relative distances between the light source, the optical element 40, and the blade 11 would be determined in a conventional manner in conjunction with the curvature of the lens to provide the desired effect. Additionally, it will be apparent that an optical system, comprising two or more optical elements may be substituted for the single optical element 40 shown.

The optical element 40 may also serve to protect the light bulb 13 from flying debris. A non-collimating sheet of clear material (not shown) may alternately be provided solely for this purpose. Because periodic disassembly for cleaning, for example, to remove sappy or wet sawdust, will be required, releasable connections between the housing and the components therein are provided.

Also, providing relatively reflective and non-reflective surfaces, for example by smooth or rough surface treatments, within the housing in appropriate areas may further enhance the operation of the cut-line indicator of the present invention. For example, it has been found that roughening the surfaces within the shroud 15 which are parallel to the plane of the blade, for example plastic guards (not shown), improves the sharpness of the shadow line 23 projected.

Figure 3:
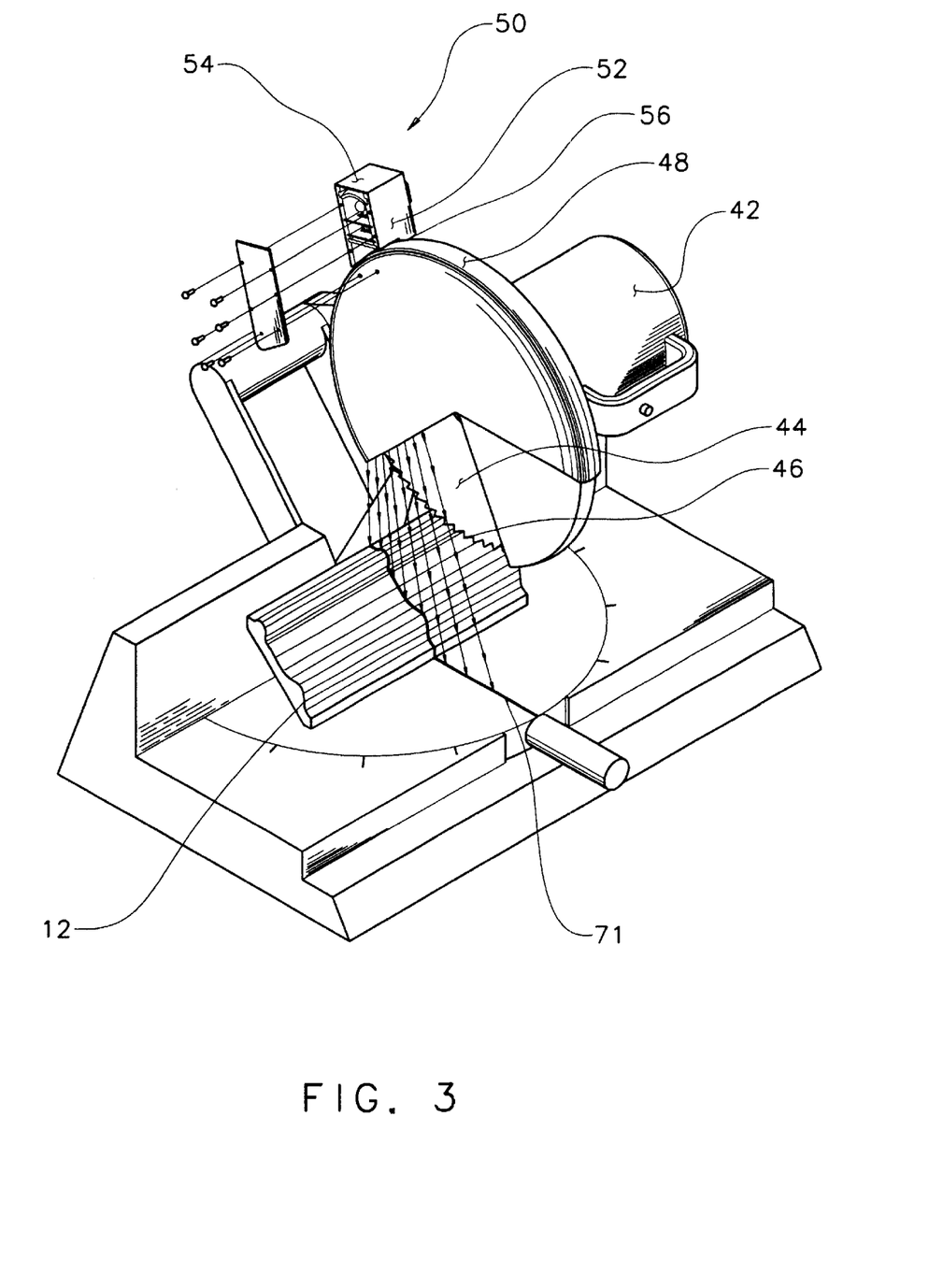
FIG. 3 is a perspective view of a kerf indicator according to a second embodiment of the present invention.

Depicted in FIG. 3 is an alternative embodiment of the present invention. As disclosed therein, a power saw 42 is provided having a circular blade 44 with a cutting edge 46. Blade 44 rotates about an axis perpendicular to the cutting edge so that the workpiece 12 is cut as blade 44 engages workpiece 12. Blade 44 is partially enclosed by a protective shroud 48. Mounted on shroud 48 is a kerf indicator 50. Kerf indicator 50 includes a housing 52 having a free top end 54 and a bottom end 56 mounted to shroud 48.

Figure 4:
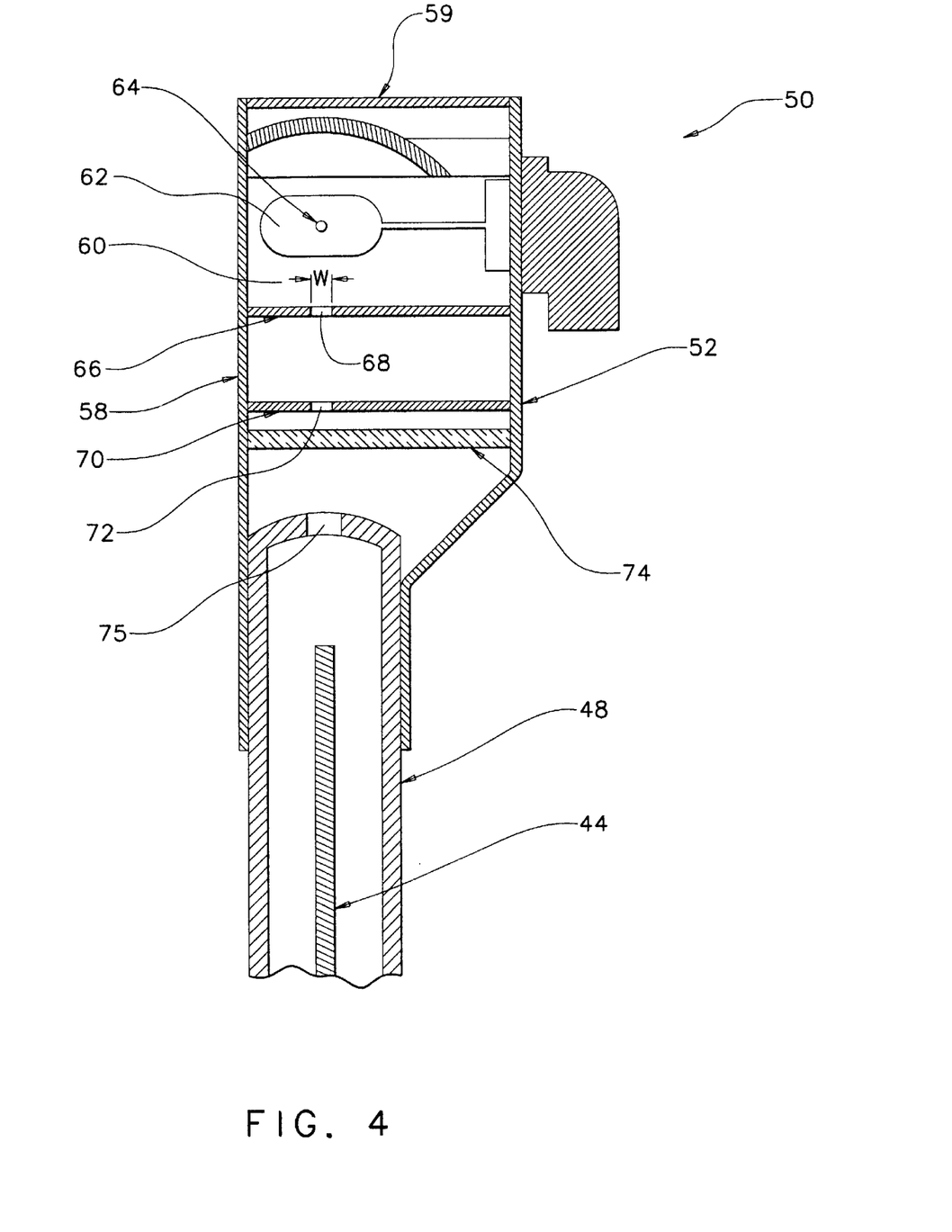
FIG. 4 is an enlarged, cross-sectional front view of the kerf indicator shown in FIG. 3.
Figure 5:
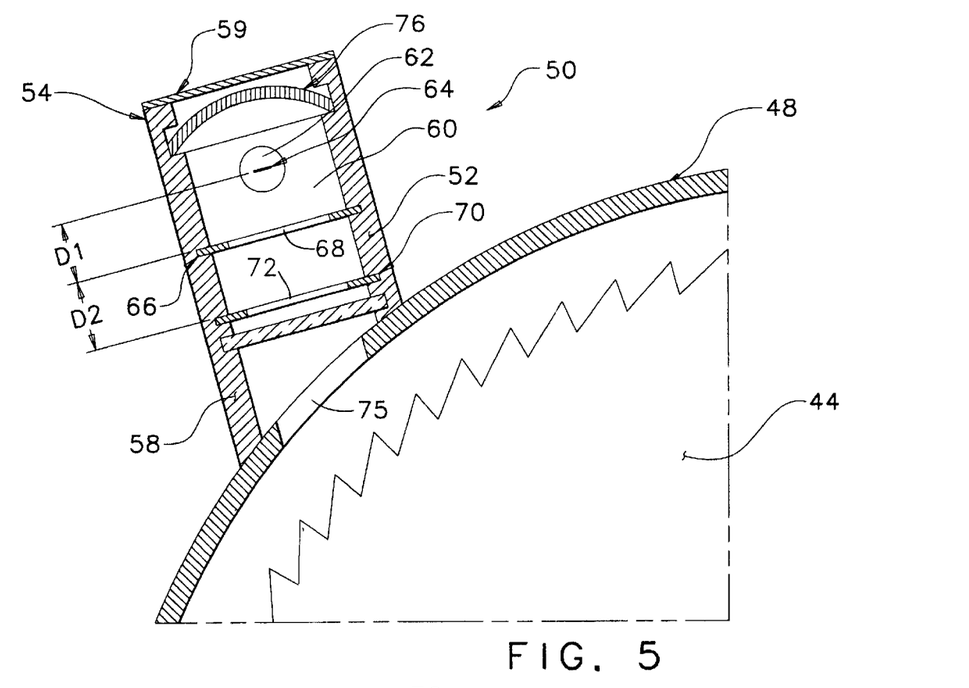
FIG. 5 is a cross-sectional side view of the kerf indicator shown in FIG. 3.

As depicted in FIGS. 4 and 5, housing 52 further includes a plurality of interconnected sidewalls 58 and a top cover 59 which bound a chamber 60. Chamber 60 communicates with blade 44 through an elongated opening 75 extending through shroud 48. Disposed within chamber 60 and attached to sidewall 58 is a light bulb 62 operating as a light source. Formed within light bulb 62 is a straight, elongated filament 64. One example of light bulb 62 is the General Electric 886 headlight bulb.

Disposed between light bulb 62 and shroud 48 is an opaque first barrier 66. Extending through first barrier 66 is a narrow, elongated first slot 68. Positioned between first barrier 66 and shroud 48 is an opaque second barrier 70. Extending through second barrier 70 is a second elongated narrow slot 72. Positioned between second barrier 70 and shroud 48 is a translucent shield 74. Translucent shield 74 prevents wood particles and dirt from passing further into housing 52.

First slot 68, second slot 72, opening 75, and light bulb 62 are each aligned in the plane of blade 44. Accordingly, as light emanates from light bulb 62, the light travels through slots 68 and 72, through opening 75, and around each side of blade 44. As a result of blade 44 blocking a portion of the light, a shadow 71, as seen in FIG. 3, is cast on workpiece 12. The shadow has a width equal to the thickness of blade 44 and corresponds to the kerf or cut that will be produced as a result of blade 44 contacting workpiece 12.

The present invention has discovered the unexpected and surprising result that as a result of using two opaque barriers with narrow slots, as opposed to just one, the clarity of the shadow is significantly improved. Accordingly, a user is better able to ascertain the location and size of an expected kerf. Barriers 66 and 70 function to increase the clarity of the shadow by at least partially planarizing the light from light bulb 62. The light from light bulb 62 is initially emitted in all directions within chamber 60. However, only the light that passes through slots 68 and 72 shines on blade 44. The light rays that are not aligned with slots 68 and 72 are either absorbed by or bounce off of barriers 66 and 70 and housing 50 until they become aligned and pass through slots 68 and 72. As a result of planarizing the light, shadow line 71 becomes sharp and clear.

Referring to FIG. 4, in one example of kerf indicator 50, slots 68 and 72 have a width W in a range between about 0.08 inches to about 0.18 inches with about 0.1 inches to about 0.14 inches being more preferred. In one embodiment, slots 68 and 72 can have different widths. As the thickness of blade 44 increases, it is preferred that the width of slots 68 and 72 also increase such that light can pass on both sides of blade 44. In relative terms, the width W of slots 68 and 72 is in a range between about 1.1 to about 1.5 times the thickness of blade 44 with about 1.2 to about 1.4 times the thickness of blade 44 being more preferred. Where it is necessary to change the width of the slots 68 and 72, barriers 66 and 70 can simply be slid out of housing and replaced with barriers having different sized slots.

Referring to FIG. 5, the distance $D_1$ between light bulb 62 and first barrier 66 is in a range between about 0.5 inches to about 3 inches with about 0.5 inches to about 1.5 inches being more preferred. Maximizing the distance $D_2$ between first barrier 66 and second barrier 70 increases the clarity of shadow line 71. Distance $D_2$ is typically in a range between about 0.5 inches to about 3 inches. These dimensions can of course vary as the size of the saw and thickness of the blade changes.

In alternative embodiment, shroud 48 having opening 75 can be used to replace an opaque barrier or as an additional opaque barrier. When not being so used, however, opening 75 should wider than the width of slots 68 and 72.

Figure 6:
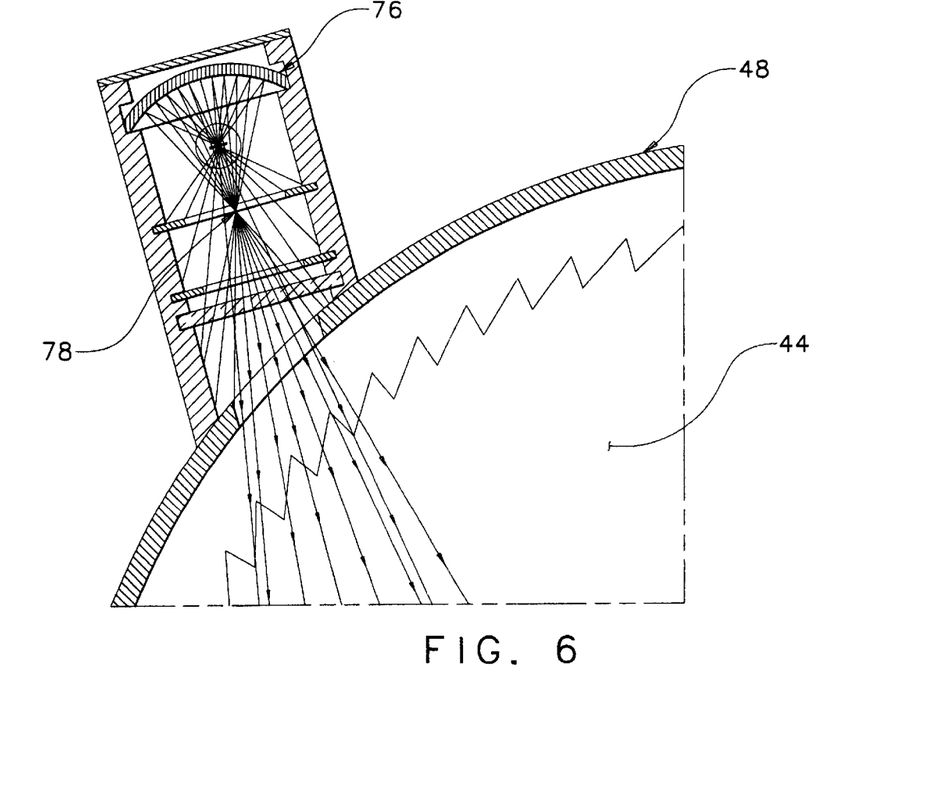
FIG. 6 is a cross-sectional, schematic view of the kerf indicator shown in FIG. 3 indicating the light path as affected by a reflector.

Mounted within chamber 60 at top end 54 is a reflector 76. Reflector 76 is preferably formed from a polished metal and has a parabolic configuration. Reflector 78 is used to reflect and focus light emanated from light bulb 62 towards blade 44. As depicted in FIG. 6, reflector 76 has a foci 78. The present invention has discovered that by constructing reflector 76 such that foci 78 is positioned between light bulb 62 and second barrier 70, the effectiveness of the reflected light is optimized. That is, the resulting shadow 71 is most clearly displayed.

It has also been discovered that by aligning filament 64 of light bulb 62 parallel to and in the plane of slots 68 and 72, as shown in FIGS. 4 and 5, clarity of shadow 71 is also improved. The clarity is further improved if filament 64 is smaller than slots 68 and 72 since more light is directly passed through the slots.

Figure 7:
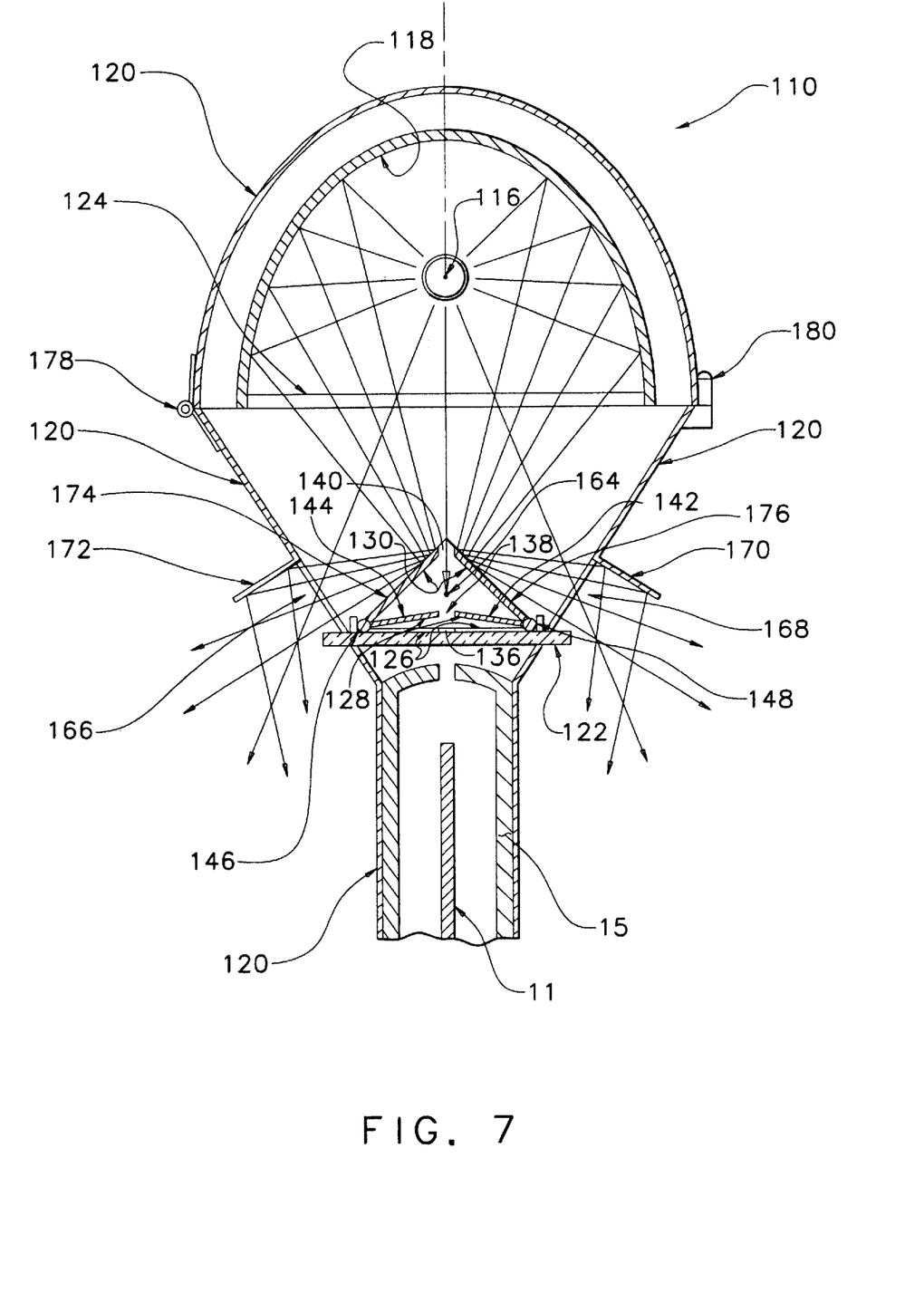
FIG. 7 is a cross-sectional view of a third embodiment of a kerf indicator according to the principles of the present invention.

A third embodiment of the present invention, pictured in FIG. 7, provides an alternative method of adjusting the width of the slots in the barrier member. The third embodiment utilizes two elongated slots, one of which is adjustable as to its width. The kerf indicator 110 of the third embodiment of the present invention includes a light source 116 and a curved, preferably parabolic, reflector 118 carried by a heat shield 120. The heat shield 120 may be secured to the shroud 15 of, for example, a miter saw 10 by conventional means. This embodiment further includes a removable transparent window element 122 to protect the cut indicator from dust and debris. The cut indicator 110 may also incorporate a further transparent dust shield 124. This transparent dust shield serves to keep dust from the critical area around the light source 116 and reflector 118.

The barrier member of the present embodiment includes three opaque barriers 126, 128, and 130, defining three elongated slot-like openings 136, 138, and 140 therein. At least one of these openings is adjustable, in that the width of the opening can be varied.

As shown in FIG. 7, the middle opaque barrier 128 is actually formed of two hinged plates 142, 144 which rotate about axles 146 and 148, and do so in a coordinated way so that the center of the opening 138 does not shift. The edges of the opaque barrier 128 defining the opening 138 move in unison closer together or farther apart as the plates 142, 144 rotate about their respective axles 146 and 148. The plate movement may be coordinated by the cooperation of two adjustment dials and gears (not shown) which interfit and cooperate to provide symmetric movement. The dials may also incorporate a stop to prevent rotation of the plates 142, 144 beyond desired limits about their associated axles 146 and 148.

Also illustrated in FIG. 7, the heat shield 120 incorporates openings 166 and 168 on opposite sides of the heat shield. The openings are formed by bending portions of the heat shield outward to form flanges 170 and 172. These openings serve at least two functions, including allowing the escape of heat, and providing a pathway for light as will be discussed.

The first or upper opaque barrier 130 comprises two panels 174, 176. The upper surfaces of the panels 174, 176 of the upper opaque barrier 130 are given a reflective surface treatment. Light rays projected from the light source 116 striking the upper surfaces of the upper opaque barrier are reflected outwardly through the openings 166 and 168 in the heat shield 120. Light thus reflected out of the heat shield 120 either passes onward along an unchanged path, or strikes the underside of the flanges 170 and 172. The underside flange surfaces are also given a reflective surface treatment. Accordingly, light striking the underside of the flanges is again reflected in a downward direction towards the workpiece. This light provides improved additional illumination of the workpiece.

The adjustability of the width of the slot-like openings gives rise to a corresponding adjustability in the sharpness, and/or width to some degree of the shadow line cast by the blade 11. The umbra and penumbra of the shadow projected are altered by this adjustment to yield a sharply defined shadow line with a width equivalent to the width of the blade 11 and the consequent kerf. This adjustability allows compensation to be made when blades of different widths and diameters are used.

In further detail, the heat shield 120 is hinged to allow access to the interior thereof to clean the surface of the transparent dust shield 124, for example, and the reflective upper surfaces of the panels 142, 144 comprising the first or uppermost opaque barrier 130, for example. A hinge 178 and releasable clasp closure 180 are provided to allow such access periodically as required.

The elliptical reflective surface 118 has two foci, as is well understood, and the light source 116 can be a tubular halogen bulb having a filament disposed at a first foci of the elliptical reflector. A second foci 164 of the reflector is positioned between the first opaque barrier 130 and the second opaque barrier 128.

As will be readily appreciated, many equivalent methods of adjusting the width of at least one of the elongated slots, as an alternative to the method embodied in FIG. 7, may be utilized and fall within the scope of the present invention. For example, with reference to FIG. 4, one or both of plates 66,70 may be made to slide transversely to the path of the light 20. A plurality of elongated slots having different widths may be provided along the length of such sliding plates 66,70 so as to be brought, each in turn, into the path of light 20 by the sliding motion of the plates 66,70. Alternatively, one or both of the plates 66,70 may be divided by the slot. In such a case, each half of the divided plates 66,70 can be made to slide transversely to the path of the light 20 in a manner coordinated with the other half so as to alter the width of the slot, i.e., the division between the two halves of the plate, as needed. These an other equivalent configurations will be apparent to those skilled in the art and are all within the scope and principles of the present invention.

Figure 8:
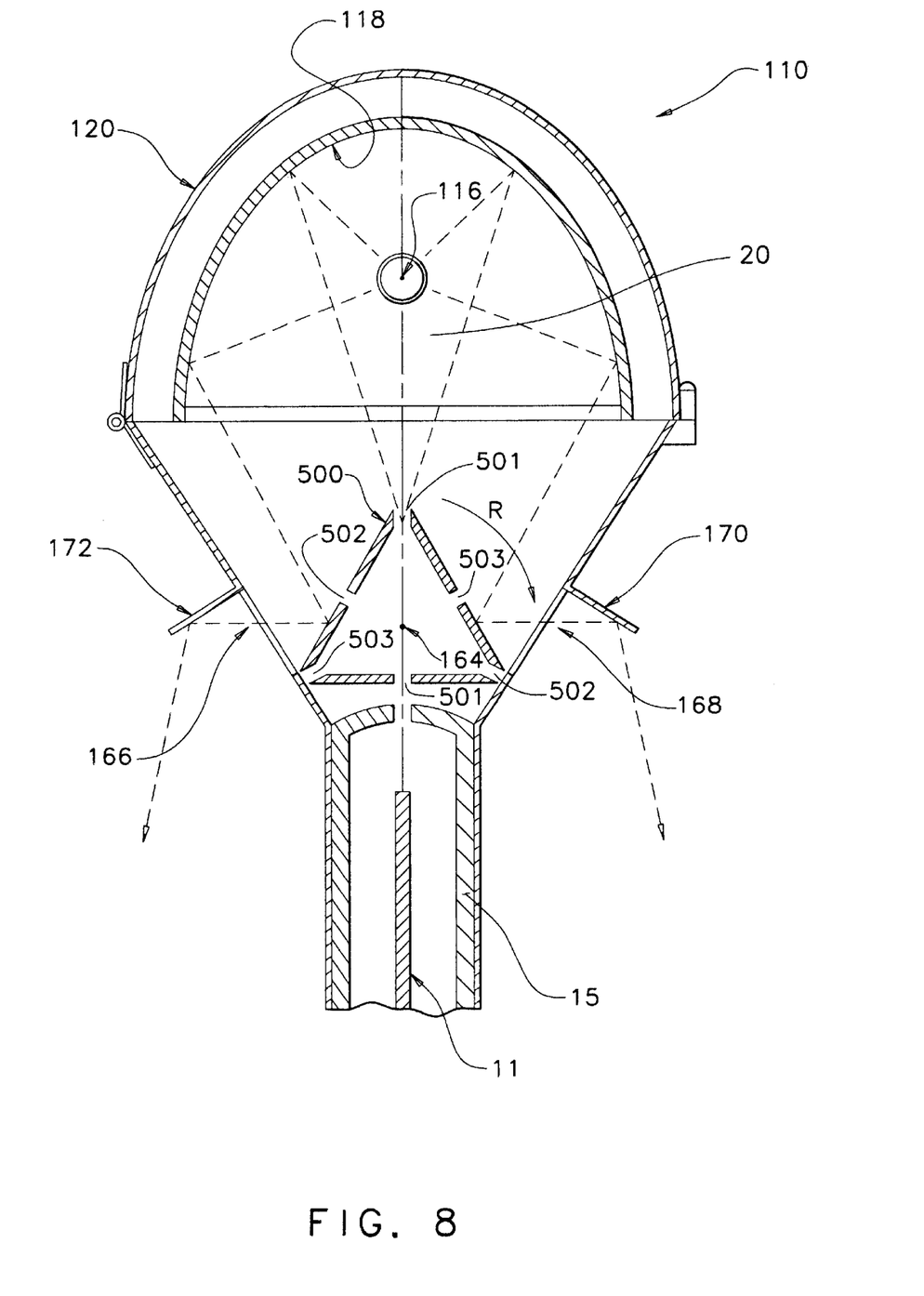
FIG. 8 is a cross-sectional view of a fourth embodiment of a kerf indicator according to the principles of the present invention.

FIG. 8 illustrates yet another such equivalent. The embodiment of the present invention illustrated in FIG. 8 is similar to that of FIG. 7, however, the barrier member 500 has a triangular cross-section with three pairs of associated slots that may be brought into the path of light 20 by the rotation of barrier member 500 as indicated by arrow R. The "associated" slots of barrier member 500 are a slot at a corner of the triangular cross-section paired with a slot in the opposite side of the triangular cross-section. Associated slots are given the same reference numeral, the three pairs being 501, 502 and 503.

Each pair of associated slots 501, 502 and 503 will have different widths. Thus the width of the slot or slots in the path of the light 20 may be adjusted by rotating barrier member 500 to bring a different pair of slots into the light path. Both associated slots may have the same width. In such a case, the three pairs of slots may have, for example, respective widths of 0.1, 0.12 and 0.14 inches. As will be readily appreciated by those skilled in the art, an equivalent barrier member with, for example, a round, square, hexagonal, pentagonal, or other cross-section and varying numbers of paired slots may be used to provide more that three possible slot width options.

Barrier member 500 may also be made to have a reflective surface so that light 20 which does not enter the elongated slots is reflected out the openings 166, 168 and reflected downward by the flanges 170, 172 as described with reference to FIG. 7.

While several particular forms of the invention have been illustrated and described, it will also be apparent that various modifications and improvements can be made without departing from the spirit and scope thereof. Accordingly, it is not intended that the invention be limited, except by the appended claims.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A method for use with a power saw having:
    a frame with a first blade rotatably mounted thereon, the first blade having a cutting edge with a maximum first thickness;
    a light source mounted on the frame; and
    an opaque barrier having a first slot with a first width, the opaque barrier being positioned in alignment with the light source such that light from the light source passes through the first slot and shines on the first blade so as to produce a shadow of the first blade;
    the method comprising the acts of:
        exchanging the first blade with a second blade, the second blade having a cutting edge with a maximum second thickness, the second thickness being larger than or smaller than the first thickness of the first blade;
        adjusting the opaque barrier such that the first slot is replaced with a second slot having a second width, the second slot being aligned with the light source such that light from the light source passes through the second slot and shines on the second blade so as to produce a shadow of the second blade, the second width of the second slot being greater than or smaller than the first width of the first slot; and
        wherein the first and second slots are selected based on the first thickness or second thickness of the first or second blades such that definition of the shadow is maintained.

2. A method as recited in claim 1, wherein the act of adjusting the opaque barrier is performed before, after, or concurrently with the act of exchanging the first blade with the second blade.

3. A method as recited in claim 1, wherein the opaque barrier has the first slot and the second slot formed thereon, the act of adjusting the opaque barrier comprising sliding the opaque barrier along a plane such that the second slot is aligned with the light source.

4. A method as recited in claim 1, wherein the opaque barrier comprises a first plate and a second plate with the first slot being bounded therebetween, the act of adjusting the opaque barrier comprising moving at least the first plate relative to the second plate so that the second slot is formed between the first plate and the second plate.

5. A method as recited in claim 1, wherein the opaque barrier comprises a first plate and a second plate with a first slot being bounded therebetween, the first plate being disposed in a plane that intersects with a plane of the second plate at an angle, the act of adjusting the opaque barrier comprising rotating at least the first plate relative to the second plate so that the slot is formed between the first plate and the second plate.

6. A method as recited in claim 1, further comprising a reflector positioned on a side of the light source opposite the opaque barrier.

7. A method as recited in claim 1, further comprising a translucent shield disposed between the opaque barrier and the blade.

8. A method as recited in claim 1, wherein the opaque barrier has the first slot and the second slot formed thereon, the act of adjusting the opaque barrier comprising rotating the opaque barrier about an axis such that the second slot is aligned with the light source.

9. A power saw as recited in claim 8, wherein the opaque barrier bounds a hollow chamber through which the first slot and the second slot extend.

10. A method for use with a power saw having:
    a frame with a first blade rotatably mounted thereon, the first blade having a cutting edge with a maximum first thickness;
    a light source mounted on the frame; and
    a first opaque barrier having a first slot with a first width, the first opaque barrier being positioned in alignment with the light source such that light from the light source passes through the first slot and shines on the first blade so as to produce a shadow of the first blade;
    the method comprising the acts of:
        exchanging the first blade with a second blade, the second blade having a cutting edge with a maximum second thickness, the second thickness being larger than or smaller than the first thickness;
        replacing the first opaque barrier with a second opaque barrier having a second slot with a second width, the second slot being aligned with the light source such that light from the light source passes through the second slot and shines on the second blade so as to produce a shadow of the second blade, the second width of the second slot being greater than or smaller than the first width of the first slot; and wherein the first and second slots are selected based on the first thickness or second thickness of the first or second blades such that definition of the shadow is maintained.

11. A method as recited in claim 10, wherein the act of replacing the first opaque barrier is performed before, after, or concurrently with the act of exchanging the first blade with a second blade.

12. A method as recited in claim 10, wherein the first opaque barrier and the second opaque barrier each comprise a discrete plate.

13. A method for use with a power saw having:

a frame with a first blade rotatably mounted thereon, the first blade having a cutting edge with a maximum first thickness;

a light source mounted on the frame; and a first barrier slot having a first width being positioned in alignment with the light source such that light from the light source passes through the first barrier slot and shines on the first blade so as to produce a shadow of the first blade;

the method comprising the acts of:

exchanging the first blade with a second blade, the second blade having a cutting edge with a maximum second thickness, the second thickness being larger than or smaller than the first thickness;

replacing or adjusting the first barrier slot so that a second barrier slot is aligned with the light source such that light from the light source passes through the second barrier slot and shines on the second blade so as to produce a shadow of the second blade, the second barrier slot having a second width that is greater than or smaller than the first width of the first barrier slot; and wherein the first barrier and second barrier slots are selected based on the first thickness or second thickness of the first or second blades such that definition of the shadow is maintained.

14. A method as recited in claim 13, wherein the act of replacing or adjusting the first barrier slot is performed before, after, or concurrently with the act of exchanging the first blade with the second blade.

15. A method as recited in claim 13, wherein the act of replacing or adjusting the first barrier slot comprises replacing a first opaque barrier having the first barrier slot formed thereon with a second opaque barrier having the second opaque barrier slot formed thereon.

16. A method as recited in claim 13, wherein the act of replacing or adjusting the first barrier slot comprises sliding along a plane an opaque barrier having the first barrier slot and the second barrier slot formed thereon such that the second barrier slot is aligned with the light source.

17. A method as recited in claim 13, wherein the act of replacing or adjusting the first barrier slot comprises rotating about an axis an opaque barrier having the first barrier slot and the second barrier slot formed thereon such that the second barrier slot is aligned with the light source.

18. A method as recited in claim 13, wherein the first barrier slot is bounded between a first plate and a second plate each disposed in substantially the same plane, the act of replacing or adjusting the first barrier slot comprising moving at least the first plate relative to the second plate so as to form the second barrier slot between the first plate and the second plate.

19. A method as recited in claim 13, wherein the first barrier slot is bounded between a first plate and a second plate, the first plate being disposed in a plane that intersects with a plane of the second plate at an angle, the act of replacing or adjusting the first barrier slot comprising rotating at least the first plate so that the second barrier slot is formed between the first plate and the second plate.

* * * * *